United States Patent

[11] 3,593,110

[72] Inventor Rudolf P. Huebener
Downers Grove, Ill.
[21] Appl. No. 858,828
[22] Filed Sept. 17, 1969
[45] Patented July 13, 1971
[73] Assignee The United States of America as represented by the United States Atomic Energy Commission
[32] Priority Oct. 18, 1968
[33] Germany
[31] P 18 03 804.5

[54] DIRECT-CURRENT GENERATOR FOR SUPERCONDUCTING CIRCUITS
16 Claims, 3 Drawing Figs.

[52] U.S. Cl. .......... 322/2, 136/207, 310/4, 321/1.5
[51] Int. Cl. .......... H02n 11/00
[50] Field of Search .......... 322/2; 310/4, 10, 40; 174/DIG. 6; 136/207, 204; 321/1.5

[56] References Cited

UNITED STATES PATENTS

| | | | |
|---|---|---|---|
| 2,750,791 | 6/1956 | Hanysz et al. | 136/207 X |
| 3,478,230 | 11/1969 | Otter, Jr. et al. | 322/2 X |

*Primary Examiner*—Oris L. Rader
*Assistant Examiner*—H. Huberfeld
*Attorney*—Roland A. Anderson ABSTRACT: A DC generator for a superconducting circuit includes a thermoelectric material member with superconductors connected across the member and the superconducting circuit. A heater attached to one end of the thermoelectric member creates a potential gradient along the member while the member is subject to an environmental temperature which maintains the superconductors in a superconducting state.

Inventor
Rudolf P. Huebener

Attorney

Inventor
Rudolf P. Huebener

[signature]
Attorney

DIRECT-CURRENT GENERATOR FOR SUPERCONDUCTING CIRCUITS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to a method and means for supplying DC current to superconducting circuits and more particularly to the generation for a superconducting circuit of a DC current using a thermoelectric generator.

Superconducting circuits carrying a large direct current are used in a variety of applications. One major application is a superconducting magnet which can sustain a large magnetic field with little or no consumption of electrical power. Superconducting magnets are generally energized from a conventional DC generator or battery with current leads running from the DC source into the superconductor coolant where they are connected to the superconducting magnet coil. Since the direct current is generated at room temperature, the current leads have to pass from the region at room temperature into the region at the temperature of the superconductor coolant. With this structure and method of operation, the current leads must be large in cross section to carry high currents and the thermal conduction of the current leads causes large losses of the superconductor coolant.

In order to avoid this disadvantage, DC generators have been developed or proposed earlier in which the current is generated in the part of the system located in the superconductor coolant. For example, a DC transformer with a superconducting secondary is known. In this case, the superconducting secondary circuit consists of a secondary of a small number of windings with a large cross section and the field coil consists of numerous windings of small cross section. If the primary current is cut off, a continuous current is generated in the secondary circuit. (K. Mendelssohn, "Production of High Magnetic Fields at Low Temperatures" in *Nature*, a Weekly Journal of Science, London, 132, No. 3337, 602 [10-14-1933].) The primary of a transformer of the mentioned type has been supplied with alternating current of low current strength and an alternating current of high current strength was generated in this manner which was rectified by superconducting elements. (J. L. Olsen, "Superconducting Rectifier and Amplifier" in *The Review of Scientific Instruments*, 29, No. 6, 537 [June 1953] and T. Buchhold, "Superconductive Power Supply and its Application for Electrical Flux Pumping" in *Cryogenics*, 4, 212.) Attempts have also been made to generate a direct current for superconducting circuits by "pumping" a magnetic flux into a superconducting system by a suitable arrangement of superconducting valves. The magnetic flux related to the individual pumping pulses of so-called flux pumps is amplified with the result that the direct current connected with the pumped flux unit is also amplified. In the Unipolardynamo (J. Vogler and P. S. Admiral, "A dynamo for Generating a Persistent Current in a Superconducting Circuit" in *Physics Letters*, 2, No. 5, 257 [10-1-1962] as well as in the Leiden pump (H. van Beelen, A. J. P. T. Arnold, R. de Bruyn Ouboter, J. J. M. Beenakker, K. W. Taconis, "A flux Pump for the Generation of High Persistent Currents in a Superconducting Foil Magnet" in *Physics Letters*, 4, No. 5, 310 [5-1-1963]), the necessary direct current is generated in the superconducting circuit by the movement of a magnet. Instead of generating the current by moving magnets, it has also been proposed to use the rotating magnetic field of a number of correspondingly connected electromagnets for current generation.

All presently known systems for the generation of direct current in superconducting circuits have the disadvantage that their construction is too expensive and that it is often necessary to introduce current conductors of large cross section into the superconductor coolant. Because of the thermal conduction of the current conductors, this leads to superconductor coolant losses by evaporation even with intermittent operation.

SUMMARY OF THE INVENTION

It is therefore one object of the present invention to provide a method and means for generating in a superconducting temperature environment DC power.

It is another object of the present invention to provide a method and means for generating DC power for a superconducting magnet with lower heat losses than heretofore.

It is another object of the present invention to provide a DC generator operable in a superconducting temperature environment.

Other objects of the present invention will become more apparent as the detailed description proceeds.

In general, the present invention comprises a thermoelectric-material member and superconductor means connecting the member across a superconducting circuit. Means are provided for producing a temperature gradient along the member connected across the superconducting circuit while maintaining the member and the superconductor means at a temperature to operate the superconductor means in a superconducting state.

BRIEF DESCRIPTION OF THE DRAWING

Further understanding of the present invention may best be obtained from consideration of the accompanying drawings wherein.

DETAILED DESCRIPTION OF THE PREFERRED EMBODIMENT

Figures 1, 3:
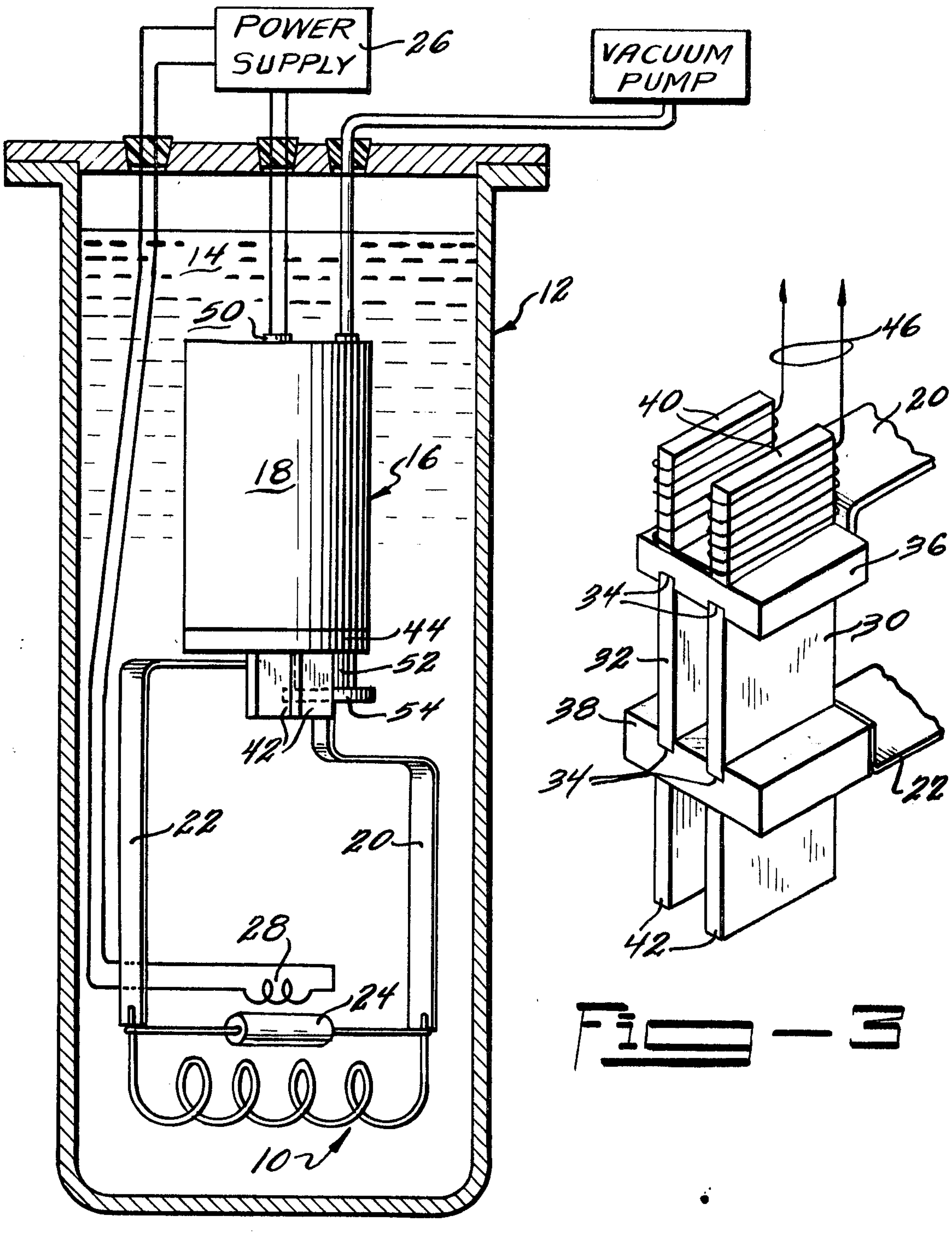
FIG. 1 is a sketch of an apparatus for the practice of the present invention.
FIG. 3 is a sketch of the thermoelectric generator of FIG. 2 apart from the container.
Figure 2:
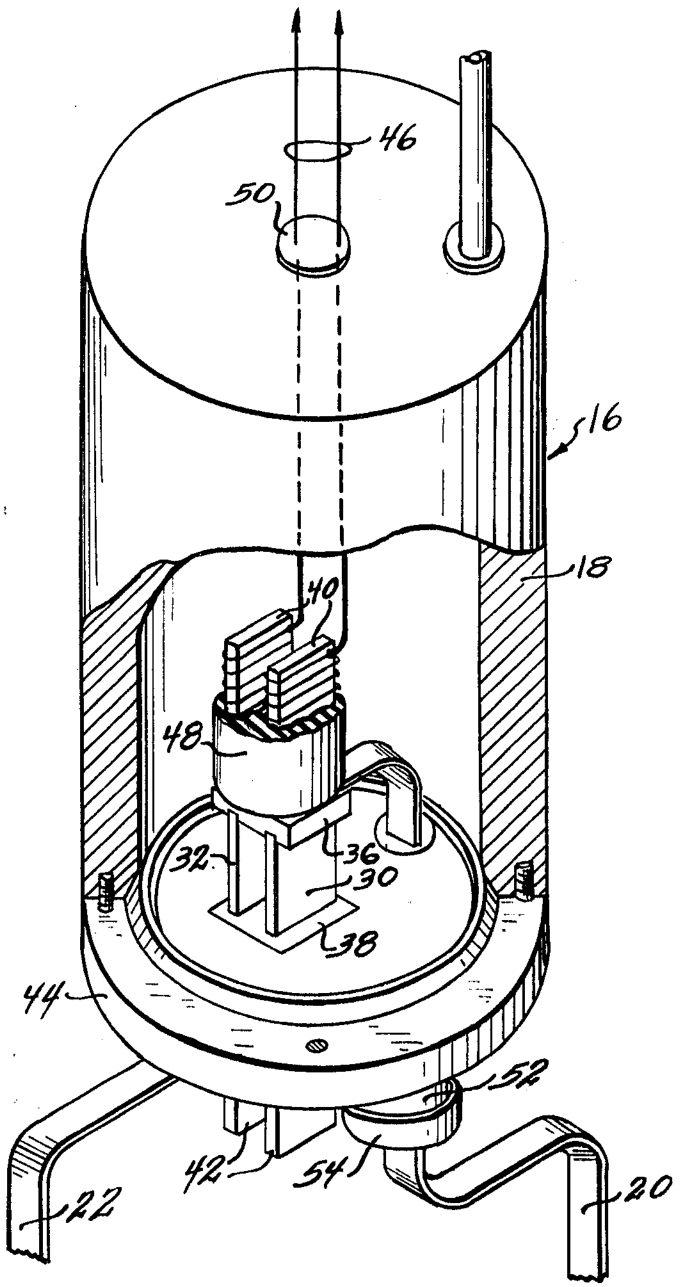
FIG. 2 is a sketch of the container of the apparatus of FIG. 1 cut away to show the thermoelectric generator mounted therein.

In FIGS. 1—3, there is shown a structure for the practice of the present invention. A superconducting magnet 10 is mounted in a cryostat 12 containing a superconductor coolant 14, such as liquid helium. A thermoelectric generator 16 constructed according to the present invention and disposed in an evacuated container 18 is mounted within the coolant 14. Superconductors 20 and 22 connect the output of the thermoelectric generator 16 across the magnet 10. A superconductor shunt 24 is connected across the superconductors 20 and 22. A power supply 26 provides current to the thermoelectric generator 16 and to the magnet coil 28 of the superconductor shunt 24.

The thermoelectric generator 16 comprises two plates 30 and 32 of thermoelectric material capable of producing a thermoelectric voltage at superconducting temperatures. The plates 30 and 32 are mounted in two tight-fitting grooves 34 cut into each of slabs 36 and 38. The slabs 36 and 38 are each of a like material having good electrical and thermal conductivity. The mounting of the plates 30 and 32 in the grooves 34 is secured by soldering with a superconducting solder, such as indium. Extending from the slabs 36 and 38 on the sides thereof opposite the grooves 34 are fins 40 and 42 respectively. The fins 40 and 42 are of the same material as the slabs 36 and 38, and in fact, may be machined so that the construction of the slabs and associated fins is effected in one piece. The slab 38 is hard soldered into the base 44 of the container 18 so as to be sealed thereto. Thus, the plates 30 and 32, slab 36, and fins 40 are mounted within the interior of the container 18 and the fins 42 of slab 38 extend from the container in contact with the superconductor coolant 14.

A heater wire 46 of a suitable material, such as manganin, is tightly wound around both fins 40 of slab 36 and a suitable potting material 48 is disposed about the heater wire 46 to hold it in place. The heater wire 46 is then brought out from the container 18 through vacuum seals 50 to the power supply 26.

The superconductor 22 from one side of the superconducting magnet 10 is connected to the slab 38 immediately adjacent the plates 30 and 32 to provide the shortest possible current path through the slab 38 to the plates 30 and 32. The superconductor 20, from the other side of the magnet 10, is connected to the slab 36 immediately adjacent the plates 30 and 32 to provide the shortest possible current path through the slab 36 to the plates 30 and 32. Connection of the superconductors 20 and 22 to the slabs 36 and 38 is effected with a superconducting solder such as 60/40 tin-lead solder. The superconductor 20 is brought to the interior of the container 18 by passing the superconductor through a tube 52 mounted through the base 44 and a cap 54 mounted on the tube. A vacuum-tight feedthrough of the superconductor 20 through the tube 52 and cap 54 is effected by solder sealing the base 44 to the tube 52, the cap 54 to the tube 52, and the superconductor 20 to the cap 54. This feedthrough tube does not have to be completely isolated electrically from the container 18. It is sufficient for the practice of the present invention if the electrical resistance between the two superconductors 20 and 22, via the container 18, is large relative to the electrical resistance between the superconductors 20 and 22, via the superconducting magnet 10. In the aforedescribed structure, this is effected by making the tube 52 of different material than the base 44 of the container 18. For example, tube 52 may be of stainless steel and the cap 54 and the base 44 of container 18 may be made of brass. The base 44 is sealed to the container 18 using an indium gasket to form a sealed container which may then be evacuated and immersed in the superconductor coolant 14.

In operation, the superconductor coolant 14 in the cryostat 12 provides an environmental temperature, such that the superconducting magnet 10 and the superconductors 20 and 22 are maintained in a superconducting state. The current from the power supply 26 through the heater coil 28, disposed about fins 40, establishes a temperature gradient along the thermoelectric plates 30 and 32 since the fins 42 are in contact with the superconducting coolant 14. The temperature gradient along the thermoelectric plates 30 and 32 establishes a thermoelectric voltage at the ends of the plates 30 and 32 wherefrom a current is generated to flow through the superconducting magnet 10. It is to be noted that since the evacuated container 18 is immersed in the superconducting coolant 14, the temperature of the thermoelectric generator in its operation is approximately that of the coolant 14. Thus, the superconductors 20 and 22 are maintained in a superconducting state and large currents may be generated and supplied to the magnet 10 without large losses.

The magnet field from coil 28 of superconducting shunt 24 maintains the shunt in a normal condition. When sufficient current is flowing in the magnet coil 10, the magnet current through the coil 28 is terminated causing the shunt 24 to become superconducting and permitting the maintenance of a sustained current in the magnet 10 when the thermoelectric generator output is terminated.

As stated, with a temperature gradient established along the plates 30 and 32, a thermoelectric voltage U is developed between the ends thereof. This voltage is shorted through the superconducting magnet 10 and the current through the magnet is $I=U/R$, where R is the electrical resistance of the nonsuperconducting section, that is, namely the resistance of the plates 30 and 32. Operating with superconductors 20 and 22 at superconducting temperatures, 100 amperes were obtained from the thermoelectric generator 16 immersed in liquid helium with a temperature differential of 2° K. along the plates 30 and 32 with the following size materials. Plates 30 and 32 were made from a thermoelectric alloy, gold plus 0.002 atom percent iron and were 22 millimeters high by 15 millimeters wide and 2 millimeters thick. The slabs 36 and 38 were of high purity copper, each 6 millimeters thick and having grooves 34 cut 3 millimeters deep therein. The height of the plates 30 and 32 was 16 millimeters between slabs. The container 18 was copper, base 44 brass, and the feedthrough tube 52 was stainless steel with a brass cap 54. The superconductors 20 and 22 were stainless steel strip coated with niobium-tin. It is to be appreciated that the thermoelectric voltages of 10 to 20 microvolts per degree K. may be obtained using thermoelectric alloys, such as gold or copper with magnetic impurities (for example, gold + 0.002 atom percent iron or copper + 0.02 atom percent iron) and that with a temperature difference of 4° to 6° K. between the ends of the thermoelectric plates 30 and 32 manufactured from these materials, a thermoelectric output voltage U of approximately 100 microvolts may be obtained. Since the resistance R is small where plates 30 and 32 have large cross section, output currents I having values of hundreds of amperes may be obtained using the thermoelectric generator hereinbefore described.

It will be appreciated that, although only two plates 30 and 32 are shown in the aforedescribed embodiment, that more plates may be used in parallel to provide increased output current. Also the output voltage of the generator can be increased by using several units in series.

It is to be further appreciated that the present invention is not to be limited to the aforedescribed specific embodiment but extends to all equivalents thereof.

The embodiments of the invention in which I claim an exclusive property or privilege are defined as follows;

1. A DC generator for a superconducting circuit comprising a thermoelectric-material member, superconductor means connecting said member across said circuit, and means for producing a temperature gradient along said member connected across said superconducting circuit while maintaining said member and said superconductor means at a temperature to operate said superconductor means in a superconducting state.

2. The apparatus according to claim 1 wherein said thermoelectric-material member comprises a first body of thermoelectric-material, and second and third bodies of electrically thermally conductive material mounted at opposing ends of said first body in intimate electrical and thermal contact therewith.

3. The apparatus of claim 2 wherein said superconductor means comprise first and second superconductors each electrically connected to an associated one of said second and third bodies proximate said thermoelectric first body and to an associated side of said superconducting circuit.

4. The apparatus of claim 3 wherein said second and third bodies each include fins extensive thereof.

5. The apparatus according to claim 3 wherein said temperature gradient-producing and maintaining means comprise a container housing said first and second bodies and sealed to said third body extending therefrom, a seal sealing said container about said first superconductor electrically connected to said second body, means for heating said second body, and means for generating a temperature about said superconductors, said third body, and said container to operate said superconductors in a superconducting state.

6. The apparatus according to claim 5 wherein said first superconductor seal is of a material having an electrical resistance such that the electrical resistance between said first and second superconductors via said container is large relative the electrical resistance between said first and second superconductors via said superconducting circuit.

7. The apparatus according to claim 5 wherein said first body comprises a material of gold plus 0.002 iron atom percent or copper plus 0.02 iron atom percent.

8. The apparatus according to claim 5 wherein said first body comprises a material producing a thermoelectric effect for a temperature gradient therealong of approximately 4° K.

9. The apparatus according to claim 5 wherein said superconductors comprise a material superconducting at liquid helium temperature, and said superconducting temperature generating means comprise liquid helium surrounding in thermal contact with said container, superconductors and third body.

10. An apparatus for generating DC power comprising a first body of thermoelectric material, second and third electrically thermally conductive bodies each in intimate electrical and thermal contact with an opposite end of said thermoelectric first body, a closed container enclosing said first and second bodies and sealed to said third body extending therefrom, heating means thermally coupled to said second body, a first superconductor mounted through said container in electrical contact with said second body adjacent said first thermoelectric body, a seal sealing said container about said first superconductor, a second superconductor connected to said third body adjacent said first thermoelectric body, and a coolant disposed about said container, third body and superconductors, to effect superconducting operation of said superconductors.

11. The apparatus according to claim 10 wherein said second and third bodies each comprise a block of electrically thermally conducting material and a plurality of fins of like material extending from one side thereof, each of said blocks being slotted on the side thereof opposite said fins, said first body includes a plate of thermoelectric material sized to engage said blocks in the slots thereof, and including solder joining said plate to said blocks of said second and third bodies.

12. The apparatus according to claim 11 wherein said first superconductor is mounted through said container in electrical contact with the block of said second body, and said second superconductor is mounted in electrical contact with the block of said third body.

13. The apparatus according to claim 10 wherein said first, second, and third bodies between said first and second superconductors have an electrical resistance value which is large compared to a load resistance between said superconductors.

14. The apparatus according to claim 10 wherein said first body comprises a thermoelectric material gold plus 0.002 iron atom percent or copper plus 0.02 iron atom percent.

15. The apparatus according to claim 10 wherein said first body has a temperature gradient therealong approximately 4° K.

16. A method for generating electrical power comprising connecting a pair of superconductors across a thermoelectric material, generating a temperature gradient along said thermoelectric material, and maintaining said thermoelectric material and superconductors at a temperature to operate said superconductors in a superconducting state.